United States Patent [19]

Staubitz et al.

[11] Patent Number: 5,558,219
[45] Date of Patent: Sep. 24, 1996

[54] DISKETTE TRANSPORTER WITH SIDE CAP SURFACE STEPS

[75] Inventors: Robert Staubitz, Collinsville; Timothy Repp, New Hartford, both of Conn.

[73] Assignee: Tenex Corporation, Elk Grove Village, Ill.

[21] Appl. No.: 376,357

[22] Filed: Jan. 23, 1995

[51] Int. Cl.$^6$ .......................... B65D 85/57; B65D 43/08
[52] U.S. Cl. .................. 206/308.1; 206/45.2; 206/445; 220/356; 220/379
[58] Field of Search .......................... 206/308.1, 308.2, 206/308.3, 445, 425, 45.2, 44 R; 220/694, 729, 212, 352, 356, 379

[56] References Cited

U.S. PATENT DOCUMENTS

| 639,054 | 12/1899 | Jenkinson | 206/45.2 |
| 2,564,244 | 8/1951 | Bibler | 206/45.2 X |
| 4,519,893 | 5/1985 | Olas | 206/311 |
| 4,666,036 | 5/1987 | Bourbon | 206/425 X |

FOREIGN PATENT DOCUMENTS

| 1261338 | 4/1961 | France | 206/45.2 |
| 2156487 | 5/1973 | Germany | 206/45.2 |

*Primary Examiner*—Bryon P. Gehman
*Attorney, Agent, or Firm*—Niro, Scavone, Haller & Niro

[57] ABSTRACT

A diskette transporter is disclosed. The transporter includes a top cap which operationally engages a bottom container in a transverse direction that provides an additional plane of support and pushes the diskettes upward to different heights in order to facilitate easier selection and review. Further, the transporter includes a living hinge which allows the user to review any labels on the computer media in the bottom container prior to selection and removal.

3 Claims, 2 Drawing Sheets

DISKETTE TRANSPORTER WITH SIDE CAP SURFACE STEPS

BACKGROUND OF THE INVENTION

The present invention relates to an apparatus for storing multiple computer media storage devices. More specifically, the present invention is directed towards an apparatus for the portable storage and easy review of computer diskettes which allows for the stable placement of the storage container in operation and allows for the easy review and selection of any diskettes within the container.

With the dramatic increase in personal computers being used in the home and workplace, there exists a need to store and transport computer media storage devices such as computer diskettes and CD ROMS. Further, with the increased use of portable, notebook or laptop computers as a portable office, it is highly desirable to have a convenient yet portable method for computer media storage. The safety and integrity of such media is of utmost importance and protecting such media from dust or similar environmental contaminants is a significant concern.

In addition, it is highly desirable that any storage container occupy a minimal amount of space in order to better facilitate transport and minimize the use of valuable desk space. Present manufacturers containers for diskettes typically hold packs of ten diskettes or more. These containers are often bulky and contain more media devices than the user truly needs. With current diskette space allowing one and one half megabytes of information storage or more, the average computer user may not need more than three to five diskettes to meet all of his or her computing storage needs. Further, manufacturer's storage cases provide no easy way to review the labels of any diskettes, nor do they provide any means for easy selection by the user.

To date, no device has been created which collectively facilitates the easy transportation, display, and selection of computer media devices. Further, no device has been created which allows for the stable placement of a limited number of diskettes on a workspace while limiting the amount of workspace that is occupied and yet does not sacrifice the organizational capability of an active storage container.

SUMMARY OF THE INVENTION

The present invention is directed towards a diskette transporter with a living hinge and a cap which can be removed from the transporter and placed underneath the transporter in either a parallel or transverse direction. Thus, the present invention maintains the advantages of the prior art in allowing the transportation of a predetermined number of diskettes. In addition, it provides new advantages not found in currently available in computer media storage devices and overcomes many of the disadvantage of such currently available storage devices.

The above objects and others, which will become apparent in the description, are achieved by providing a new and novel diskette transporter. In a preferred embodiment of the invention, the transporter includes a bottom container and a top cap, where, in operation, the top cap can be placed under the bottom of the bottom container in a transverse direction, thus pushing up the diskettes in the bottom container. This preferred embodiment also contains a living hinge that allows the front surface of the bottom container to be moved, in order to facilitate review of the diskettes inside. Finally, this preferred embodiment comprises a slope on the top cap such that when the diskettes in the bottom container are pushed upwards, the diskettes are fanned out to various heights, thus facilitating easier selection and use.

Accordingly, an object of the present invention is to provide a diskette transporter for the portable storage of a limited number of diskettes.

Another object of the invention is to provide a storage container with multiple axes of stability when accessed during use.

A further object of the invention is to provide a computer media storage container that displaces diskettes to such a position to facilitate their easy selection and use.

Yet another object of the invention is to provide a computer media storage device which allows for a review of any labels on the media without removing the media from the storage device.

DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

DESCRIPTION OF THE PREFERRED EMBODIMENTS

Figure 1:
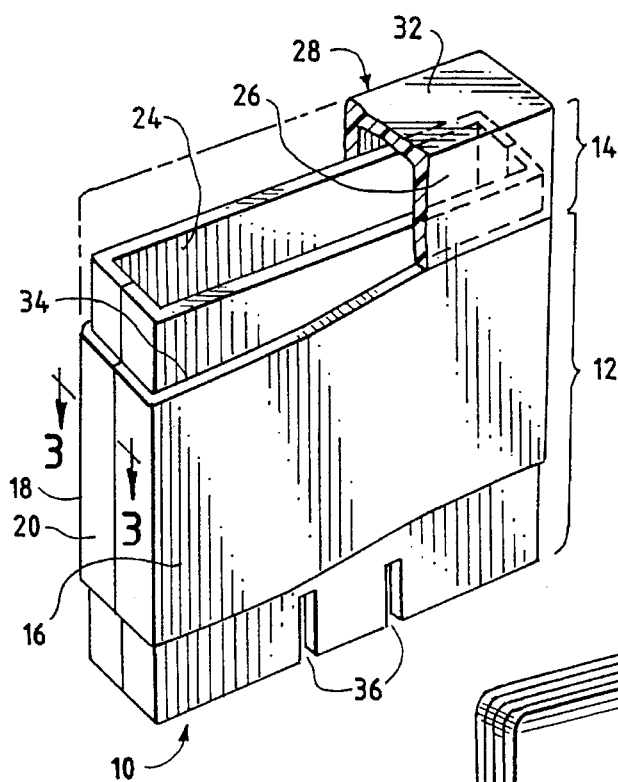
FIG. 1 is a perspective view of the present invention, including a partially exposed view of the top cap placed upon the top aperture.

FIG. 1 shows a preferred embodiment of the diskette transporter 10 that forms the present invention. The diskette transporter comprises a bottom container 12, and a top cap 14. Both components are preferably made of a durable plastic material such as polypropylene. The bottom container 12, has a front surface 16, a back surface 18, side surfaces, 20, and a bottom 22. The front, and back surfaces extend upward to form a top aperture 24. The bottom container can be of varying widths in order to be adapted for 3.5" diskettes, 5.25" diskettes, CD-ROMs, or any rigid or semi-rigid plate like computer media storage device. It should be understood that the present invention is ideally directed toward a comparatively thin transporter, i.e., thick enough to carry on the order of three to five diskettes.

Figure 2:
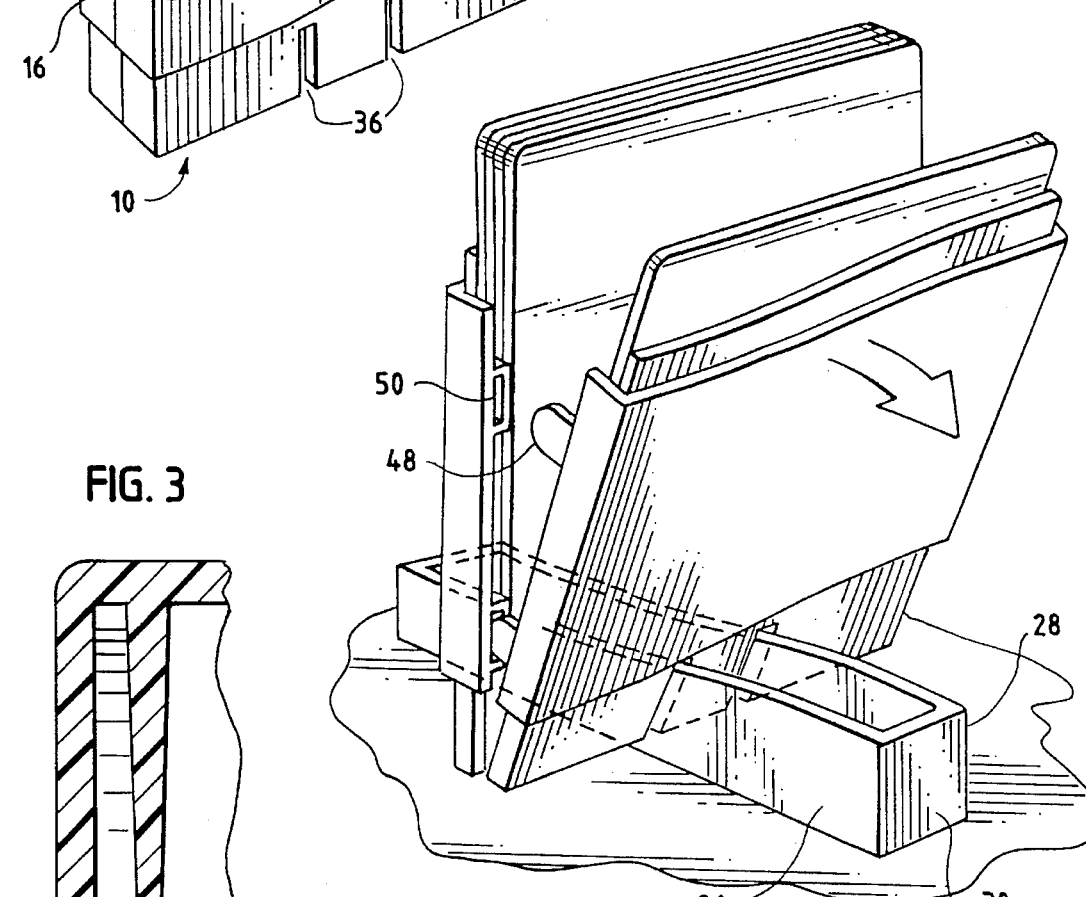
FIG. 2 is a perspective view of the present invention with the top cap engaging the slits of the bottom container to form an axis of balance in a transverse direction to the bottom of the container.
Figure 3:
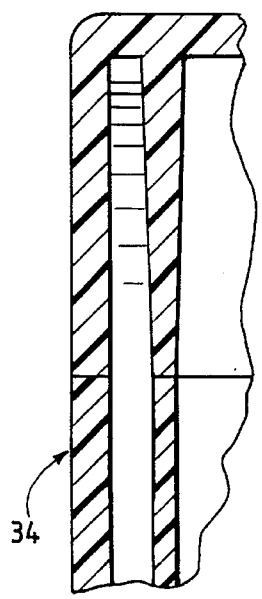
FIG. 3 is an exposed partial top view showing a detail of the bottom container of the present invention.

The top cap 14, likewise has a front surface 26, a back surface 28, side surfaces, 30 and a top 32. The top cap is of a sufficient height and depth to create a frictional sealing engagement with the bottom container so as to cover the top aperture 24 when the top cap is in the closed position, as shown in FIG. 2. Ideally, the bottom container 12 has a ledge 34 extending around all four sides, as shown in FIG. 3 which creates a mating engagement with the top cap 14 when the top cap is in the fully closed position.

Figure 4:
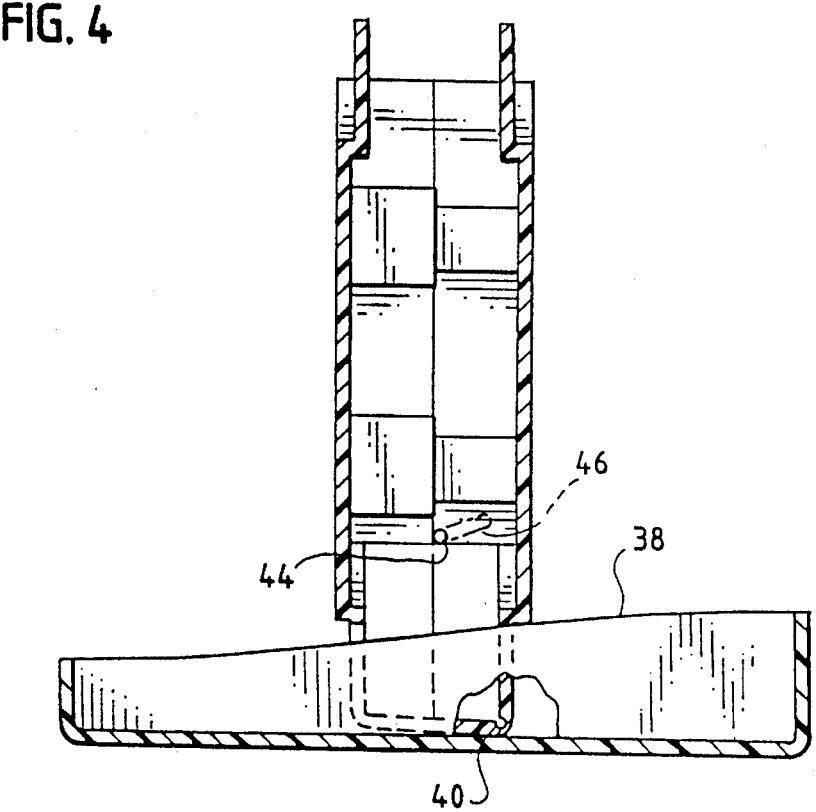
FIG. 4 is an exposed side view of the present invention showing the living hinge feature of the present invention in a closed or engaged position.

In operation, the top cap 14 can be removed and placed under the bottom 22, so as to extend in the same direction as and completely cover the bottom. Alternatively, the top cap can be placed under the bottom in a transverse direction, as is shown in FIG. 2. This operational configuration is desirable for its ability to provide additional support and balance for the bottom container 12. This transverse operational engagement is facilitated by the presence of slits 36, which are defined across the bottom 22 so as allow substantially the entire height of the front surface 26 and back surface 28 of the top cap 14 to penetrate the bottom 22 of the container. The effect of this transverse operational engagement is to push up the computer media devices inside the bottom container 12 and project such devices through the top aperture 24, thus making them easier to select and use. A further beneficial feature of this transverse operational engagement is shown more clearly in FIG. 4. Specifically, the preferred embodiment of the top cap 14 defines a curved edge 38 along the bottom edge of the front surface 26 and back surface 28. The curved edge creates a differential in the height of the top cap as it pushes up each of the computer media devices within the bottom container 12. That is, as the front surface 26 and back surface 28 each increase in height due to the slope of the edged curve 38, those surfaces will penetrate into the bottom container further, thus pushing each diskette or computer media device to a different, higher height. For example, the height of the front and back surfaces of the top cap 14 might be only 1.2 cm tall on one side of the top cap, yet the curved edge might cause those same surfaces to be 2.5 cm tall on the other side of the top cap. Such a curve would cause a differentiation by height of computer media devices within the bottom container, thus making it easier to "flip through" and select the desired diskette.

Figure 5:
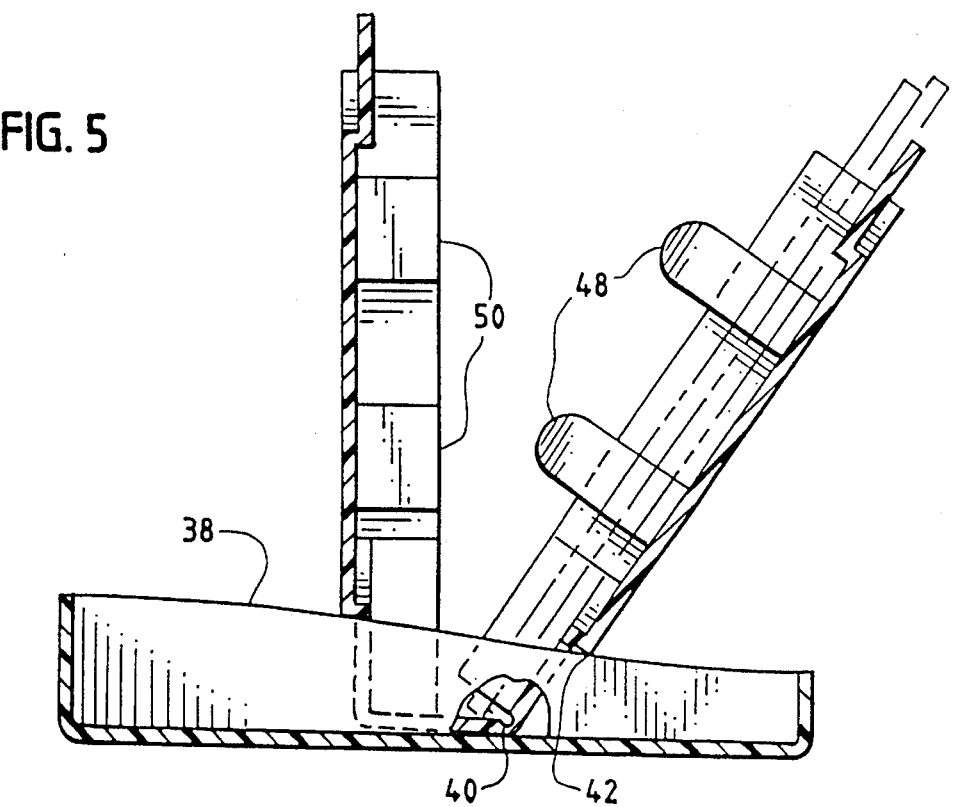
FIG. 5 is an exposed side view of the present invention showing the living hinge (without any stop) in an open position to facilitate the review of diskettes within the bottom container.

Yet another advantageous feature of the preferred embodiment of present invention, as shown in FIG. 5, is the living hinge 40. The living hinge is formed of any durable yet flexible material and preferably extends along the length of the edge between the bottom container front surface 16 and the bottom 22. In our preferred embodiment, the living hinge 40 is constructed of polypropylene and is integrally molded along with the bottom container 12. The living hinge 40 allows for a swinging movement of the bottom container front surface 16 away from the sides 20, allowing for the review of any labels on the computer media devices in the bottom container. Thus, the living hinge 40 further enhances the ability of a user to review and select any desired computer media device from the bottom container 12.

The range of movement of the living hinge 40 during operation can be limited in at least one of two ways. First, the living hinge 40 can be limited by falling against the curved edge 38 of the top cap 14. The degree to which the curved edge 38 will limit such movement, of course, will depend on a number of factors, such as the height of the curve, whether the front surface 16 is falling toward the high end of the curved edge 38 (as shown in FIG. 2) or not (as shown in FIG. 5), or whether the front surface 16 has a outward projecting lower ledge 42.

Alternatively, the range of movement of the living hinge 40 can be restricted by the presence of a stop 44 which projects from the front surface 16 that remains slidably engaged with a side aperture 46 defined in a side 20 of the bottom container. Once the stop 44 reaches the forwardmost extent of the side aperture 46, the front surface 16 will not extend any further. One advantage to limiting the range of motion of the living hinge 40 in this manner is to prevent the accidental spillage of the computer media in the bottom container. The stability of the living hinge range of motion is further reinforced by the presence of tabs 48 which are rearward projecting from the front surface 16. These tabs 48 frictionally engage sockets 50 defined in the bottom container sides 20. This tab-in-socket engagement prevents unnecessary torque on the living hinge 40 when the front surface 16 is in a closed position.

Of course, it should be understood that various changes and modifications to the preferred embodiments described herein will be apparent to those skilled in the art. Such changes and modifications can be made without departing from the spirit and scope of the present invention and without diminishing its attendant advantages. For instance, the present invention would include a stepped edge in place of the curved edge 38 in order to provide more pronounced differences in height between any diskettes that are pushed upward by the top cap 14 in its transverse engagement position. It is, therefore, intended that all such changes and modifications be covered by the following claims.

What is claimed is:

1. A transporter for the portable storage and display of multiple computer media devices, said transporter comprising:

a. a bottom container having a front surface, a back surface, two side surfaces and a bottom surface, said front, back and side surfaces forming a top aperture, said bottom surface defining a plurality of slits extending between said front surface and said back surface, and;

b. a top cap having a front cap surface, a back cap surface, two cap side surfaces, said front cap, back cap and side cap surfaces forming an aperture adapted to frictionally engage the bottom container surfaces forming said top aperture, said top cap having side cap surfaces which can operatively disengage said top aperture of said bottom container in order to operatively engage said plurality of slits to form a transverse axis of support for said bottom container, said operative engagement thereby displacing at least a portion of any computer media devices located in said bottom container above said top aperture of said bottom container, said side cap surfaces further defining a plurality of steps relative to the bottom of said bottom container such that the operative engagement of said top cap with said slits creates distinctly differentiated bases of support for said multiple computer media devices.

2. A transporter for the portable storage and display of multiple computer media devices for facilitating the easier review of said devices within said transporter, said transporter comprising:

a. a bottom container having a front surface, a back surface, two side surfaces, and a bottom surface, said front, back and side surfaces forming a top aperture, said bottom surface defining a plurality of slits extending between said front surface and said back surface;

b. a living hinge operatively connecting said front surface of said bottom container with said side surfaces and said bottom surface, said living hinge comprising a strip of flexible material between said bottom surface and said front surface, and;

c. a top cap having a front cap surface, a back cap surface, two side cap surfaces and a top, said front cap, back cap and side cap surfaces forming an aperture which can frictionally engage the bottom container surfaces forming said top aperture of said bottom container, said top cap side surfaces being capable of operatively disengaging said top aperture of said bottom container in order create an operatively engagement with said plurality of slits to form a transverse axis of support for said bottom container, said operative engagement thereby displacing at least a portion of any computer media devices located in said bottom container above said top aperture of said bottom container, said side cap surfaces further defining a plurality of steps such that the operative engagement of said top cap side surfaces with said slits creates distinctly differentiated horizontal bases of support for computer media devices placed in said bottom container.

3. A transporter for the portable storage and display of multiple computer media devices wherein said transporter facilitates the easier review of said devices by a user, said transporter comprising:

d. a bottom container having a front surface, a back surface, two side surfaces, said front, back and side surfaces forming a top aperture, said bottom container defining a plurality of slits extending between said front surface and said back surface, and;

e. a top cap having a having a front cap surface, a back cap surface, two side cap surfaces and a top, said front cap, back cap and side cap surfaces forming an aperture which can frictionally engage the bottom container surfaces forming said top aperture, said top cap having side surfaces which can engage said plurality of slits to displace said multiple computer media devices in said bottom container such that at least a portion of said media devices are visible through said top aperture, top cap side surfaces further defining a plurality of steps perpendicular to said front and back surfaces of said bottom container such that the operative engagement of said top cap side surfaces with said slits creates distinctly differentiated bases of support for computer media devices placed in said bottom container.

* * * * *